(12) United States Patent　　(10) Patent No.: US 8,098,164 B2
Gerig et al.　　(45) Date of Patent: *Jan. 17, 2012

| (54) | REPROGRAMMABLE RECEIVER COLLAR |
|---|---|
| (75) | Inventors: Duane A. Gerig, Knoxville, TN (US); Stephen T. Russell, Knoxville, TN (US); Paul McAfee, Fort Wayne, IN (US) |
| (73) | Assignee: Radio Systems Corporation, Knoxville, TN (US) |
| ( * ) | Notice: Subject to any disclaimer, the term of this patent is extended or adjusted under 35 U.S.C. 154(b) by 0 days.<br>This patent is subject to a terminal disclaimer. |
| (21) | Appl. No.: 12/652,759 |
| (22) | Filed: Jan. 6, 2010 |
| (65) | Prior Publication Data<br>US 2010/0154721 A1　Jun. 24, 2010 |

Related U.S. Application Data

(63) Continuation of application No. 11/397,164, filed on Apr. 4, 2006, now Pat. No. 7,667,607.

(51) Int. Cl.
　　*G08B 23/00*　　(2006.01)
(52) U.S. Cl. .................. 340/573.3; 340/573.1; 119/712; 119/718
(58) Field of Classification Search ............... 340/573.1, 340/573.3, 573.4; 119/712, 718, 719, 720, 119/721, 908, 174
See application file for complete search history.

(56) References Cited

U.S. PATENT DOCUMENTS

| 5,559,498 | A | 9/1996 | Westrick et al. |
| 5,799,618 | A | 9/1998 | Van Curen et al. |
| 5,815,077 | A | 9/1998 | Christiansen |
| 5,983,551 | A | 11/1999 | Lalor |
| 6,019,066 | A | 2/2000 | Taylor |
| 6,058,889 | A | 5/2000 | Van Curen et al. |
| 6,232,880 | B1 | 5/2001 | Anderson et al. |
| 6,487,992 | B1 | 12/2002 | Hollis |
| 6,549,133 | B2 | 4/2003 | Duncan et al. |
| 6,901,833 | B2 | 6/2005 | Gillis et al. |
| 6,923,146 | B2 | 8/2005 | Kobitz et al. |
| 7,667,607 | B2 * | 2/2010 | Gerig et al. ............. 340/573.3 |
| 2003/0199944 | A1 | 10/2003 | Chapin et al. |
| 2005/0000468 | A1 | 1/2005 | Giunta |
| 2005/0000469 | A1 | 1/2005 | Giunta et al. |
| 2005/0172912 | A1 | 8/2005 | Crist et al. |

* cited by examiner

*Primary Examiner* — Daryl Pope
(74) *Attorney, Agent, or Firm* — Pitts, Lake & Bell, P.C.

(57) ABSTRACT

An animal training system including a programming apparatus and an animal training collar. The animal training collar is communicatively couplable to the programming apparatus. The animal training collar includes at least one stimulation probe and a programmable device operatively connected to the at least one stimulation probe to activate the at least one stimulation probe. The at least one stimulation probe also transferring data at least one of to and from the programming apparatus.

16 Claims, 5 Drawing Sheets

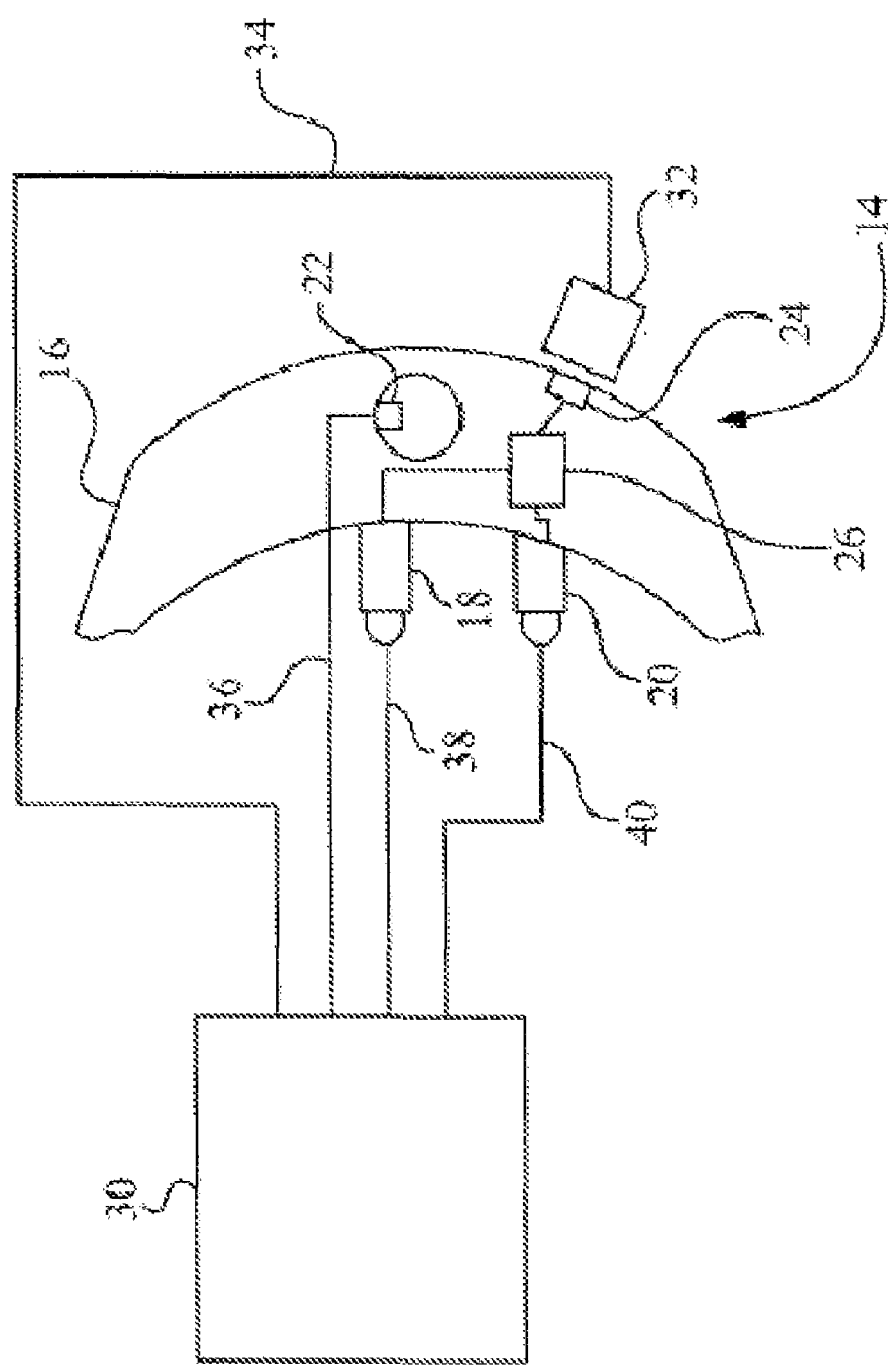

REPROGRAMMABLE RECEIVER COLLAR

CROSS-REFERENCE TO RELATED APPLICATIONS

This is a Continuation of U.S. patent application Ser. No. 11/397,164, filed on Apr. 4, 2006.

STATEMENT REGARDING FEDERALLY SPONSORED RESEARCH OR DEVELOPMENT

Not Applicable

BACKGROUND OF THE INVENTION

1. Field of the Invention

The present invention relates to an animal collar assembly, and, more particularly, to an animal collar assembly including a reprogrammable processing circuit 2. Description of the Related Art Stimulation devices are used for the modification of behavior of an animal. The stimulation device is often associated with a collar worn by the animal and is provided to improve the behavior of the animal. Some stimulation devices include twin electrodes that are positioned against the skin of an animal, which delivers an electrical stimulus to modify the behavior of the animal. The stimulus can also be in the form of a vibration, an audible noise or other sensory stimulation to gain the attention of the animal.

It is known to replace memory chips, such as programmable read only memories (PROM) in order to reprogram a device. Often integrated circuit sockets are utilized to allow the removable insertion of a PROM. Also it is known to reprogram a device by using a reprogrammable non-volatile memory and provide a data channel by which updated programming information is delivered to the non-volatile programmable memory. Reprogramming can be done by way of a computer interfacing the memory of a device by way of direct electrical connection, such as utilizing a BNC connection. It is known to provide data ports to allow access to programmable functions within a sealed electronic circuit assembly.

What is needed in the art is a method and apparatus to accomplish a reprogramming of a sealed animal training collar.

BRIEF SUMMARY OF THE INVENTION

The present invention provides an animal collar assembly including a sealed housing that is reprogrammable without having a programming port.

The invention comprises, in one form thereof, an animal training system including a programming apparatus and an animal training collar. The animal training collar is communicatively couplable to the programming apparatus. The animal training collar includes at least one stimulation probe and a programmable device operatively connected to the at least one stimulation probe to activate the at least one stimulation probe. The at least one stimulation probe also transferring data at least one of to and from the programming apparatus.

An advantage of the present invention is that the housing is sealed and data is transferred to the programmable device by way of a stimulation probe Another advantage of the present invention is that the light emitting diode is utilized to transfer data from the programmable device to the programming apparatus.

Yet another advantage of the present invention is that the battery contact and another stimulation probe are utilized to place the programmable device into a reprogramming mode.

BRIEF DESCRIPTION OF THE SEVERAL VIEWS OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 2 is a schematicized view of the training module portion of the collar assembly of FIG. 1 and an embodiment of a programming apparatus connected thereto.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
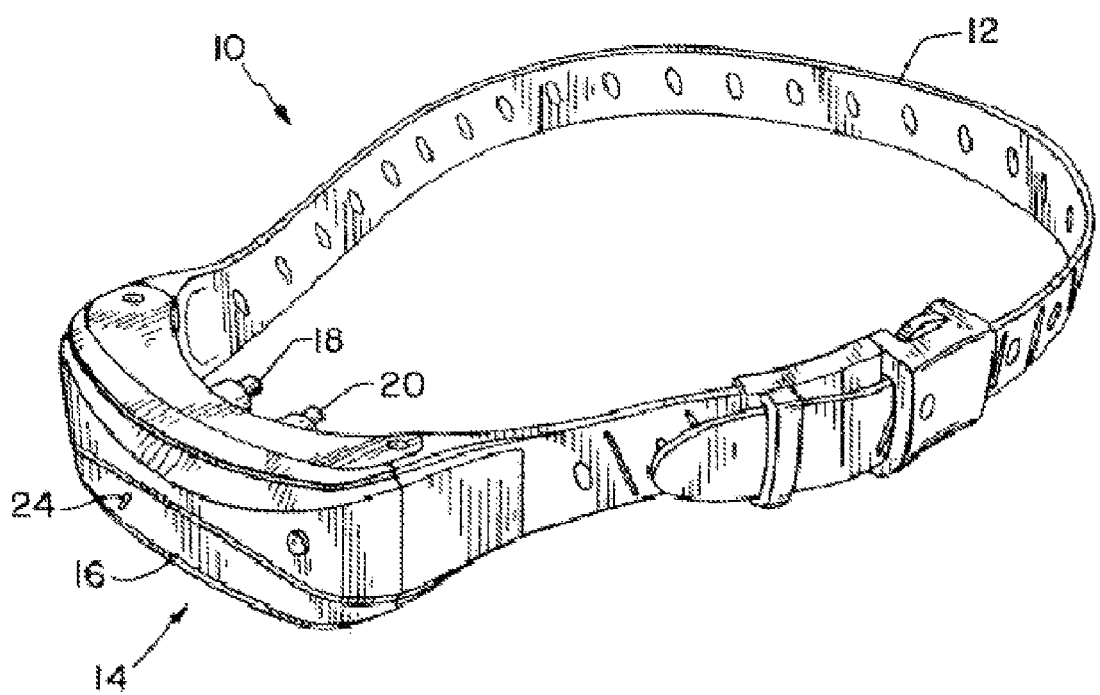
FIG. 1 is a perspective view of an embodiment of an animal collar assembly of the present invention.

Referring now to the drawings, and more particularly to FIG. 1, there is shown a collar assembly 10 including a collar strap 12 and a training module 14. Collar strap 12 is arranged to be placed about the neck of an animal and adjusted to appropriately snug training module 14 against a portion of the neck of the animal.

Now, additionally referring to FIG. 2, training module 14 includes a housing 16, an electrode probe 18, an electrode probe 20, a battery contact 22, a signal emitter 24 and a programmable device 26. Housing 16 is connected to collar strap 12 and encloses programmable device 26 completely. Housing 16 is hermetically sealed. Additionally housing 16 may be molded to completely encapsulate all of the components therein. Extending from housing 16 are electrode probes 18 and 20, which deliver a stimulus to the animal at appropriate times, as determined by programmable device 26. Housing 16 includes a removable and/or rechargeable battery, not shown and housing 16 specifically has a battery contact 22, which for the sake of clarity is illustrated as a single battery contact 22 without illustrating an associated battery contact.

Signal emitter 24 may be a light emitting diode (LED) 24 or an acoustic device 24 such as an audio speaker 24 or a piezo-electric sound emitter 24. Signal emitter 24 is operatively powered by a battery, not shown, and is connected to programmable device 26 for the conveying of information from programmable device 26 by way of signal emitter 24. Information conveyed by way of LED 24, during normal operations of collar assembly 10, may include operational status of training module 14, condition of the battery and/or acknowledgment of the receipt of a message from a transceiver, not shown. Acoustic device 24 may be used to emit acoustic signals as instructions or warnings to the animal.

For the sake of clarity, other elements which may be included in training module 14 have been omitted, such as a radio transmitter and/or receiver and separate memory, which may be a part of programmable device 26. Programmable device 26 is operatively connected to signal emitter 24 and electrodes 18 and 20. The connection is simply shown as a line in the schematic rendering of FIG. 2 and it should be understood that a separate high voltage circuit is connected to electrode probe 18 and/or 20 during operational use of training module 14 and that the connection directly shown with programmable device 26 may be disconnected during the operational use of training module 14.

As mentioned earlier housing 16 may be a completely sealed unit, which does not lend itself to replacement of memory devices therein. The construct of a sealed or molded housing 16 would result in a destructive disassembly of housing 16 in the event access to components within 20 housing 16 is desired. The advantage of having a sealed and/or molded housing 16 is that training module 14 is then highly impervious to moisture and may be simpler to manufacture. It may become necessary after training module 14 has been manufactured to modify the function and/or performance characteristics thereof. An advantage of the present invention is that it allows the product to be reprogrammed following the manufacture when normal microprocessor programming inputs are no longer available.

A programming apparatus 30 is interconnected with training module 14, as shown in FIG. 2. Programming apparatus 30 includes a signal detector 32 that is connected by way of conductor 34. Signal detector 32 is positioned proximate to signal emitter 24 to allow information to be communicated from programmable device 26 to programming apparatus 30. Signal detector 32 may be a light detector 32 if signal emitter 24 is LED 24, and signal detector 32 is a microphone 32 if signal emitter 24 is an acoustic device 24. Conductor 36 connects programming apparatus 30 to battery contact 22. Conductor 38 connects programming device 30 to first electrode probe 18. Conductor 40 connects programming apparatus 30 to second electrode probe 20. Programming apparatus 30 receives information by way of signal emitter 24 as signal emitter 24 is pulsed and/or modulated by programmable device 26. Information is sent to programmable device 26 by way of conductor 38, which is communicatively connected to high voltage electrode probe 18. Conductors 36 and 40 are utilized by programming apparatus 30 to place programmable device 26 into a mode that allows the reprogramming of programmable device 26. For example, a voltage level and/or current is passed between battery contact 22 and electrode probe 20 to cause programmable device 26 to initiate method 100, described later. Once programmable device 26 is placed into a programming mode electrical signals on conductor 38 allow programming apparatus 30 to send information through high voltage electrode probe 18 to programmable device 26. Information in the form of acknowledgement signals or other information may be passed by way of signal emitter 24 through signal detector 32 by way of electrical signals in conductor 34 to programming apparatus 30.

A desired program, to be placed into programmable device 26, is contained within programming apparatus 30 and once programmable device 26 is placed into a programmable mode, programming apparatus 30 sends the new program. The information bytes of the new program are sent as an electrical signal by way of high voltage electrode probe 18, which is then received by programmable device 26. Programmable device 26 sends acknowledgement signals that the information is being received by way of signal emitter 24 and the information is stored in a memory, which may be a part of programmable device 26 or a separate memory, not shown. This allows the programming and reprogramming of programmable device 26 by utilizing the available electrical, acoustic and/or optical connections to interface and communicate between programming apparatus 30 and programmable device 26.

While training module 14 of collar assembly 10 is reprogrammed by utilizing battery contact 22 and high voltage electrode probe 18 to place programmable device 26 in a programming mode, the use of these contacts are illustrative and other contacts may be used to accomplish this function. Programmable device 26, which may be a microprocessor, is held in a reset state when voltage is applied between battery contact 22 and stimulation probe ground electrode 20. Training module 14 may be powered by an internal rechargeable battery, if the replaceable battery is removed.

Figure 3A:
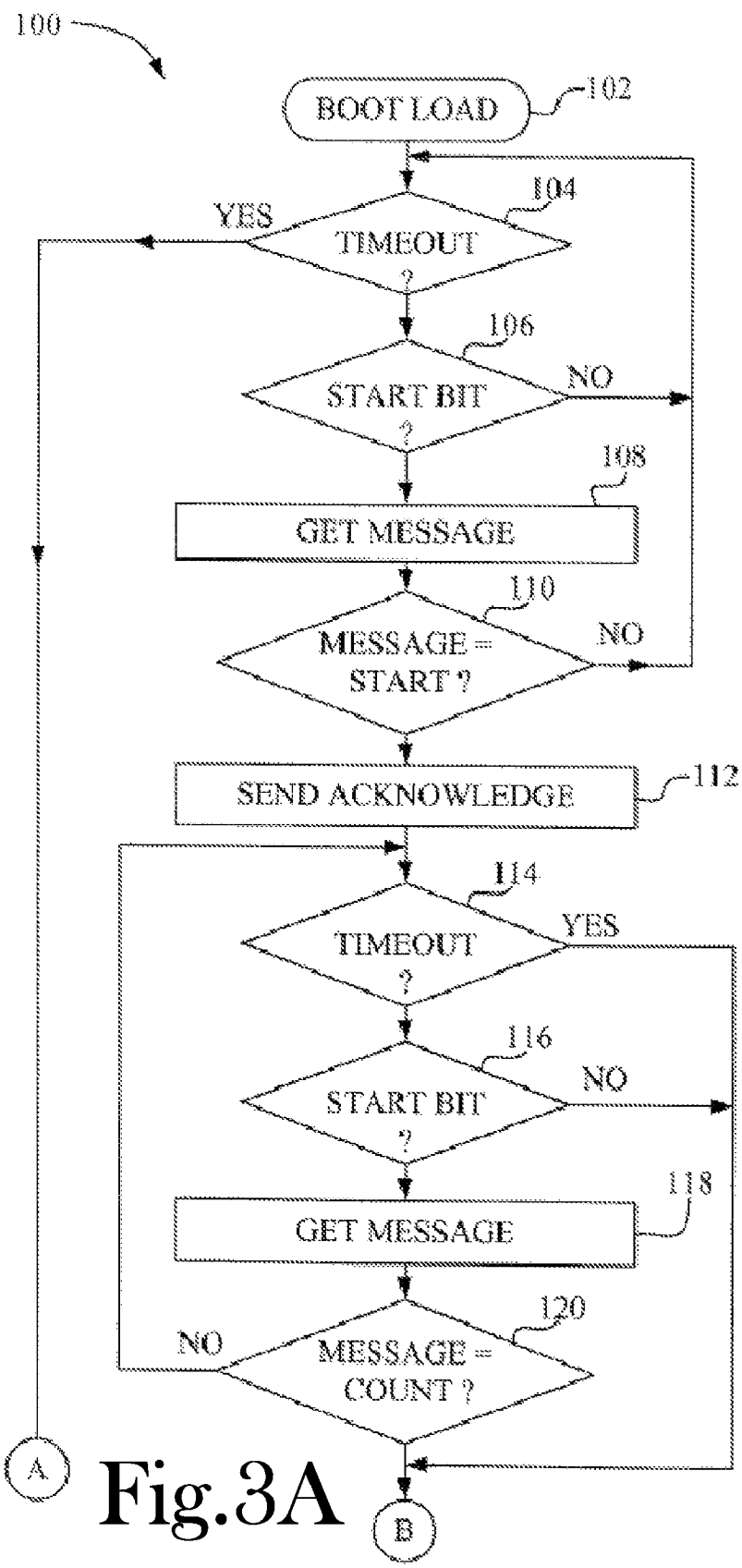
FIGS. 3A-3C illustrate a method of programming the training module of FIGS. 1 and 2.
Figure 3B:
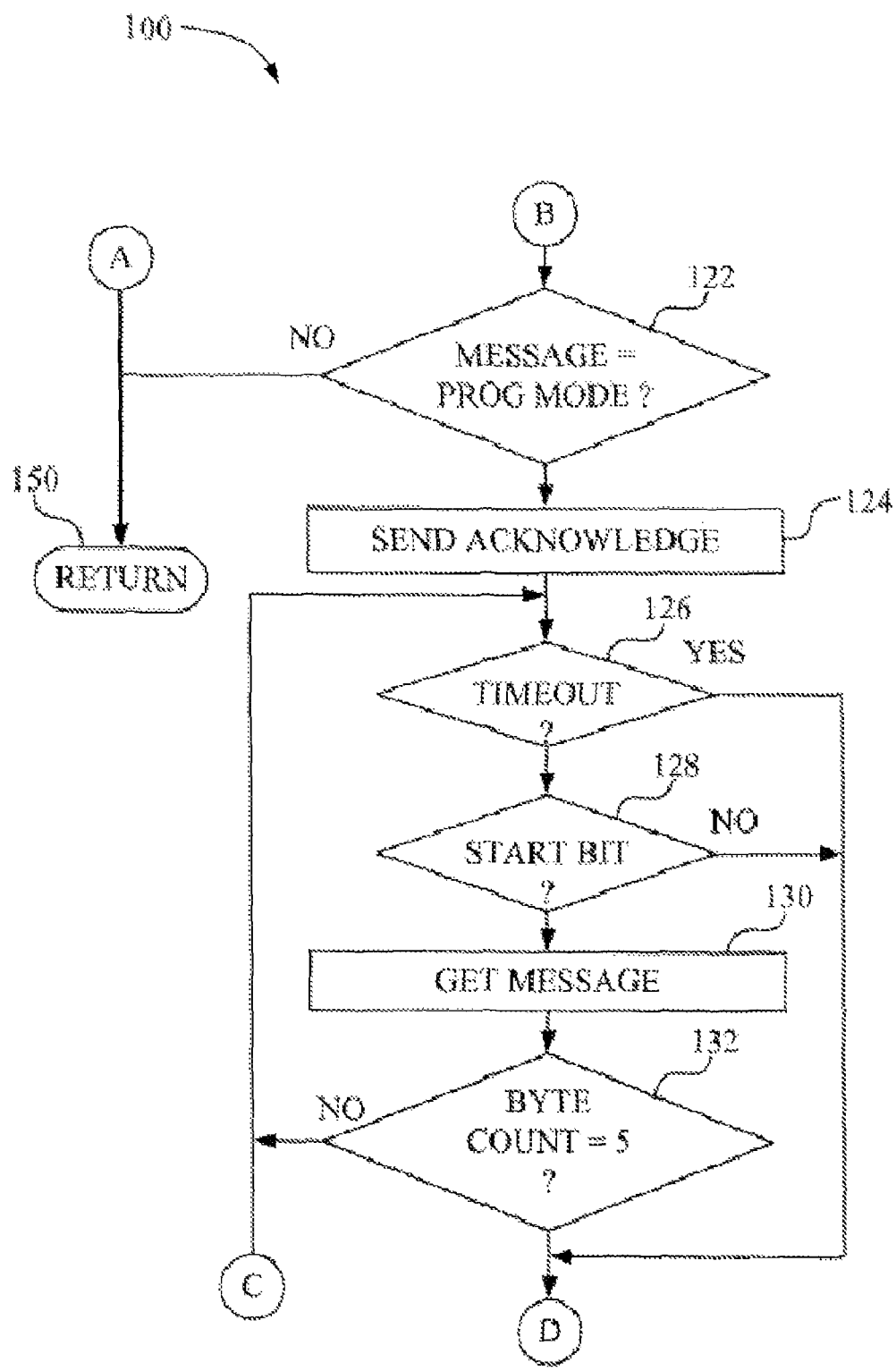
Figure 3C:
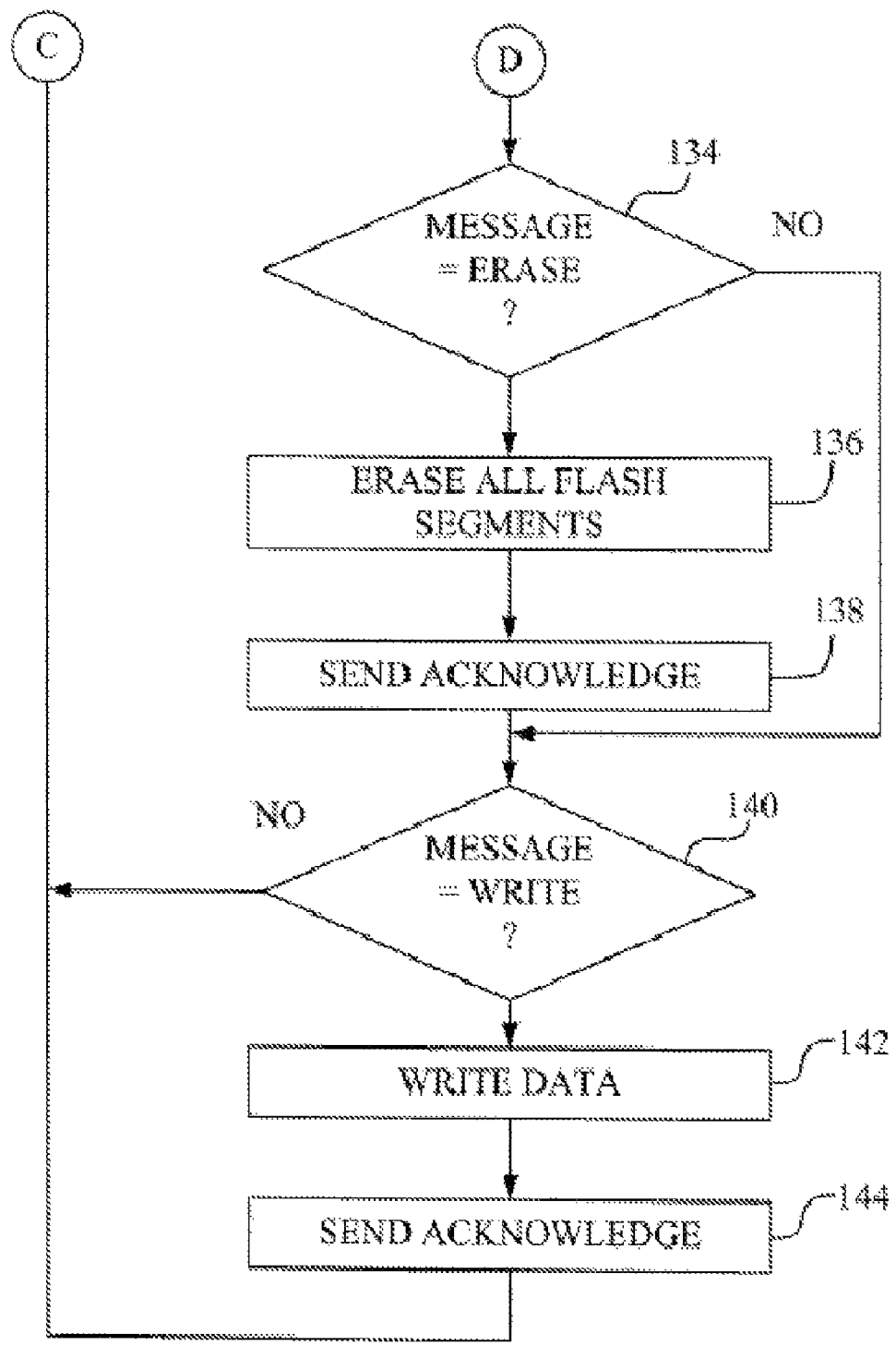

Now, additionally referring to FIGS. 3A-3C, there is shown a method 100, which can represent an embodiment of a method carried out by programming apparatus 30 and programmable device 26 for the programming of programmable device 26. At step 102, programmable device 26 is placed into a boot load mode by action of programming apparatus 30 by the supplying of a voltage between battery contact 22 and electrode 20. Time is checked at step 104 to determine whether a predetermined time has passed and if not a check is undertaken at step 106 to see if a start bit has been received. If no start bit has been received method 100 proceeds back to step 104. If the timeout at step 104 is exceeded then method 100 goes to return 150 and training module 14 exits to the normal operational mode and executes an operational program, not illustrated. If a start bit is received at step 106 then a message is obtained at step 108. If the message indicates a start mode then the method continues to step 112 and sends an acknowledge signal, which may be sent by way of signal emitter 24. If the message is not a start message then the method returns to step 104. In steps 114 through 120 there is a check to see if too much time has expired and if so the method proceeds to step 122. If there is a start bit received at step 116 another message is retrieved at step 118 until a predetermined message count is equaled at step 120. If the message count is achieved at step 120 method 100 proceeds to determining if the message indicates a programming mode is to be started, at step 122. If the message is not that a programming mode should be started then method 100 terminates by way of step 150. If a programming mode is initiated an acknowledge signal is sent at step 124 and then a loop that includes steps 126 through 132 is initiated to obtain messages until a byte count is equal to a predetermined number, such as 5. If the message received is an erase command then the flash memory segments of programmable device 26 are erased and an acknowledgement that the erase has occurred is sent at step 138. If the message received is to write the data at step 140 then the data is written at step 142 and an acknowledgement is sent at step 144. Method 100 then returns to step 126 to retrieve additional information. Once the information has been completed an ending message may be sent and method 100 ends and programming device 26 exits to the normal operational mode. The mechanism for ending the programming mode is for the removal of the reset signal from the device, which is a removal of a voltage level set between battery contact 22 and electrode probe 20.

Advantageously the present invention uses a methodology to update and/or reprogram microprocessor software in sealed electronic pet training products following the completion of normal manufacturing process and tests. This allows for changes and corrections to the performance characteristics of the product long after the product has been manufactured and is accomplished without any added cost of special programming connection points, which would affect the appearance of the product. The internal microprocessor is programmed by utilizing available electrical connections and the optical indicator that otherwise have other functions in the operational mode of the pet training product. The method outlined as method 100 may be permanently programmed into the memory of programmable device 26, thereby allowing for the initiation of method 100 when initiated by programming apparatus 30.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

Having thus described the aforementioned invention, what is claimed is:

1. An animal training system, comprising:
   a programming apparatus; and
   an animal training collar adapted to be carried by an animal, said animal training collar including:
      a pair of stimulation probes; and
      a programmable device in electrical communication with at least one of said pair of stimulation probes, said programmable device delivers an electrical stimulus to the animal by way of said pair of stimulation probes, said programmable device being capable of temporary electrical communication with said programming apparatus by way of at least one of said pair of stimulation probes such that data is transferred between said programmable device and said programming apparatus by way of the at least one of said pair of stimulation probes.

2. The animal training system of claim 1 further comprising a signal emitting device in communication with said programmable device, said signal emitting device transmitting data from said programmable device to said programming apparatus, said signal emitting device being one of a light emitting device and an acoustic emitting device.

3. The animal training system of claim 2 wherein said programming apparatus transfers data to said programmable device through one of said pair of stimulation probes.

4. The animal training system of claim 3 further comprising a battery contact, said pair of stimulation probes including a first stimulation probe and a second stimulation probe, the first stimulation probe being a ground stimulation probe and the second stimulation probe being a high voltage stimulation probe, said programmable device being directed to a programming state when a voltage is applied to said battery contact and to said first stimulation probe, said second stimulation probe being in communication with said programming apparatus when the voltage is applied to said battery contact and to said first stimulus probe.

5. The animal training system of claim 4 wherein said battery contact is a battery charge contact.

6. The animal training system of claim 1 wherein said pair of stimulation probes includes a first stimulation probe and a second stimulation probe, the first stimulation probe being a ground stimulation probe and the second stimulation probe being a high voltage stimulation probe, said programmable device being directed to a programming state when a voltage is applied to said first stimulation probe, said second stimulation probe receiving data from said programming apparatus when the voltage is applied to said first stimulation probe.

7. An animal training collar adapted to be carried by an animal, said animal training collar comprising:
   a stimulation probe; and
   a programmable device in electrical communication with said stimulation probe, said programmable device delivers a stimulus to the animal by way of said stimulation probe, said stimulation probe transfers data between said programmable device and a programming apparatus.

8. The animal training collar of claim 7 further comprising a signal emitting device in communication with said programmable device, said signal emitting device transmitting data from said programmable device.

9. The animal training collar of claim 8 wherein said stimulation probe transfers data only to said programmable device.

10. The animal training collar of claim 9 further comprising a battery contact, said stimulation probe including a first stimulation probe and a second stimulation probe, the first stimulation probe being a ground stimulation probe and the second stimulation probe being a high voltage stimulation probe, said programmable device being directed to a programming state when a voltage is applied to said battery contact and to said first stimulation probe, said second stimulation probe receiving data when the voltage is applied to said battery contact and to said first stimulation probe.

11. The animal training collar of claim 10 wherein said battery contact is a battery charge contact.

12. The animal training collar of claim 7 wherein said stimulation probe includes a first stimulation probe and a second stimulation probe, the first stimulation probe being a ground stimulation probe and the second stimulation probe being a high voltage stimulation probe, said programmable device being directed to a programming state when a voltage is applied to said first stimulation probe, said second stimulation probe receiving data when the voltage is applied to said first stimulation probe.

13. The animal training collar of claim 7 further comprising a housing, said programmable device being hermetically sealed within said housing.

14. A method for programming an animal training device comprising the steps of:
   providing a programmable device in electrical communication with a stimulation probe, the programmable device delivers a stimulus to an animal by way of the stimulation probe,
   establishing temporary electrical communication between the programmable device and a programming apparatus by way of the stimulation probe; and
   transferring data between the programmable device and the programming apparatus by way of the stimulation probe.

15. The method of claim 14, further comprising the step of sending an acknowledge signal from the programmable device by way of a signal emitting device, said signal emitting device being one of a light emitting device and an acoustic emitting device.

16. The method of claim 14, further comprising the step of placing the programmable device in a state to be programmed by supplying a voltage to another stimulation probe.

* * * * *